United States Patent Office 3,193,217
Patented July 6, 1965

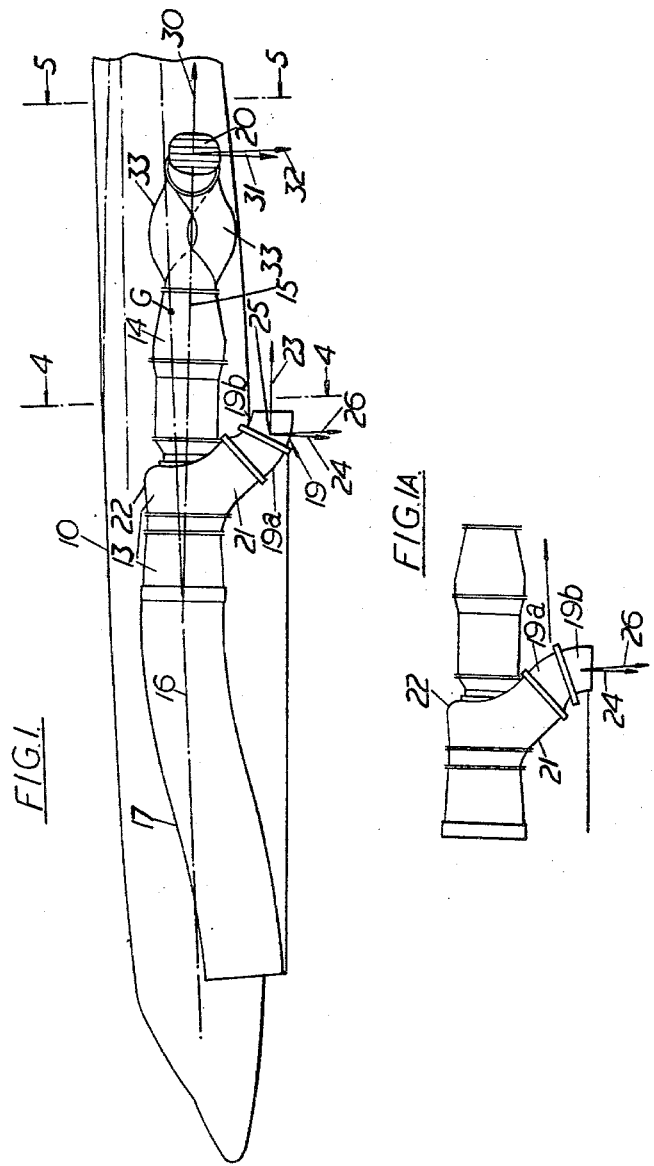

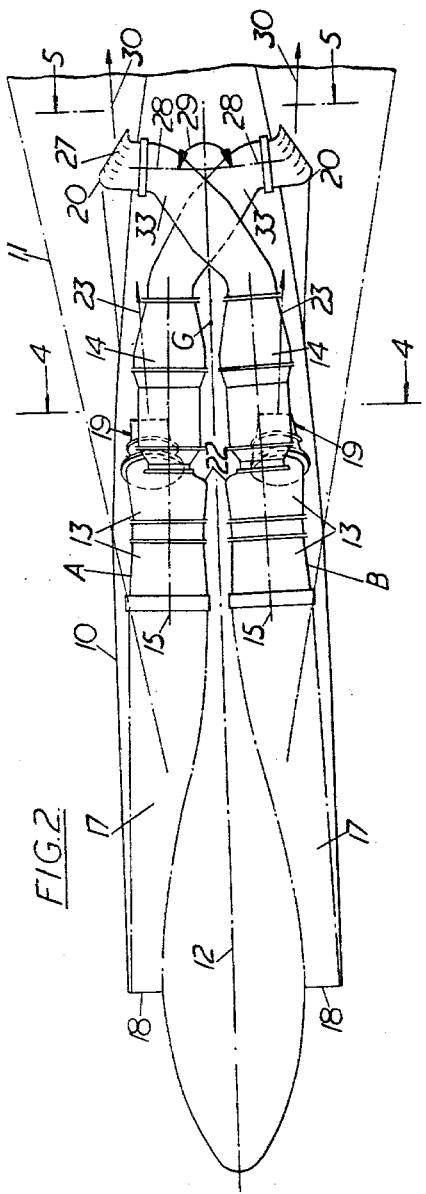
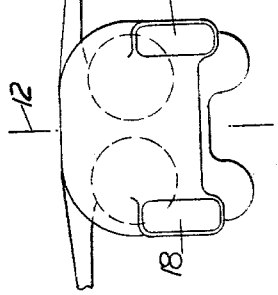
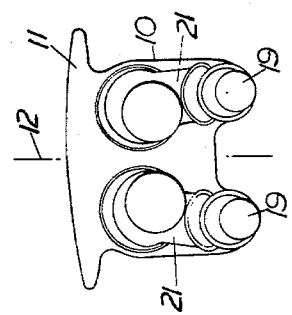
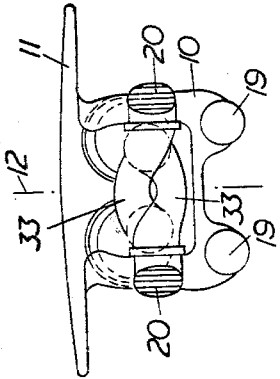

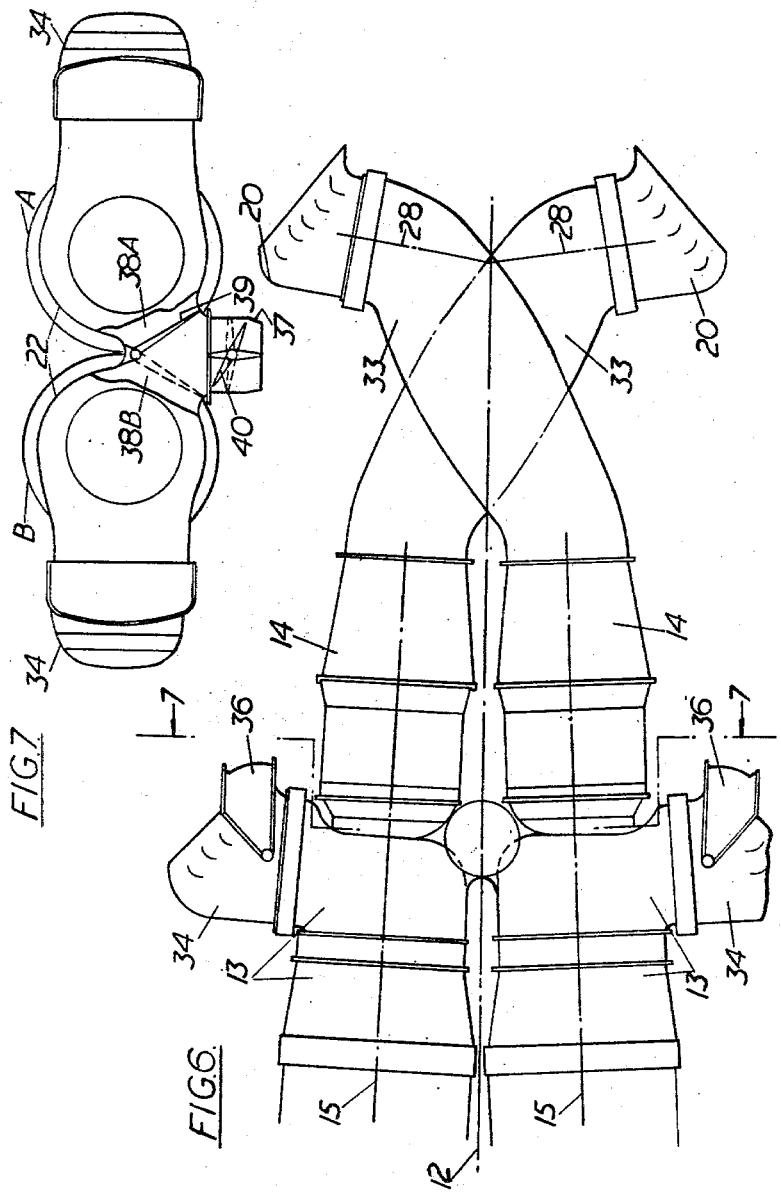

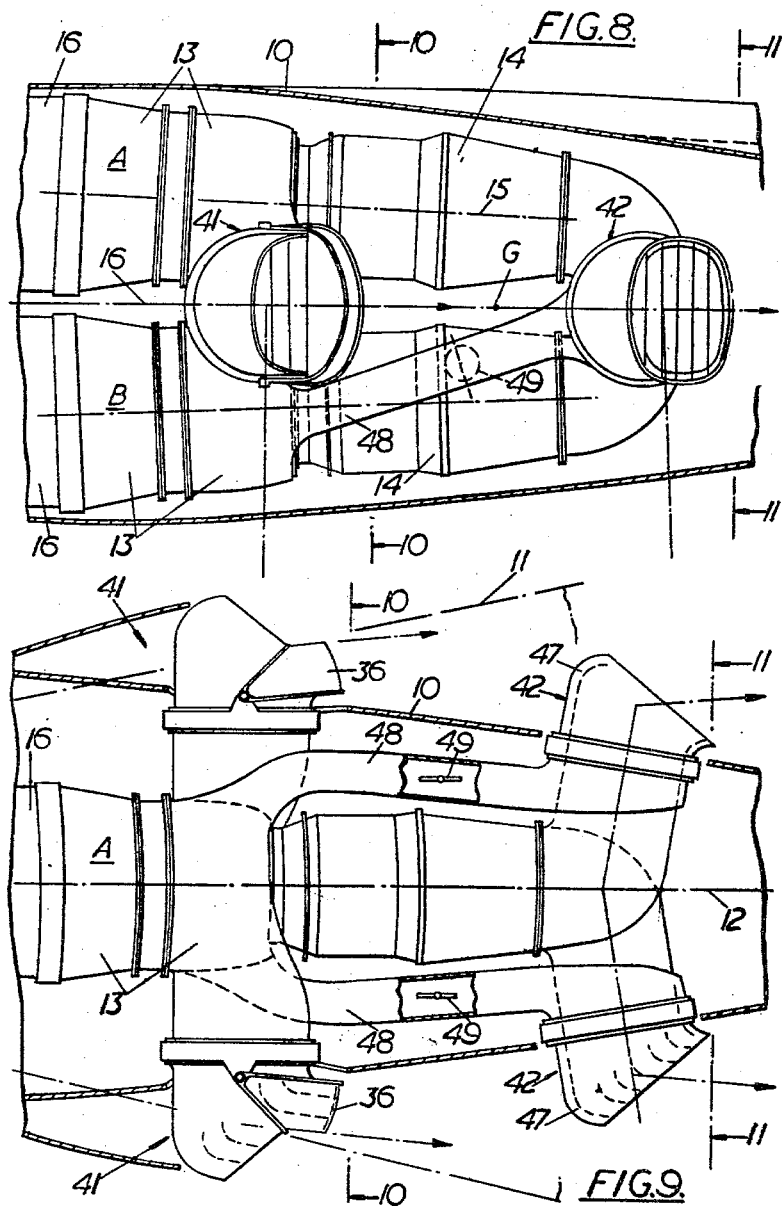

3,193,217
AIRCRAFT PROPULSION POWER PLANTS
Francis Charles Ivor Marchant, Frederick Ivens Clark, and Robert William Jaggard, all of Bristol, England, assignors to Bristol Siddeley Engines Limited, Bristol, England, a British company
Filed Dec. 26, 1963, Ser. No. 333,579
Claims priority, application Great Britain, Jan. 2, 1963, 275/63
15 Claims. (Cl. 244—23)

The invention relates to power plant for the propulsion of aircraft having short, or vertical, take-off and landing capability, comprising at least two independently operable turbojet engines both provided with means for discharging the jet efflux either rearwards or downwards, and is concerned with the problem of avoiding the introduction of large turning moments on the aircraft when an engine is shut down or becomes inoperative.

According to the invention a power plant for the purpose described comprises two turbojet engines, each including a compressor section and a turbine section coaxially arranged, the engines being disposed close together, with their axes extending substantially fore and aft, and with their lengths overlapping, a housing surrounding the engines and having an outer surface which, during horizontal flight, will be swept by relative airflow substantially in the fore and aft direction, a front and a rear pair of jet propulsion nozzles, each pair penetrating the housing outer surface symmetrically on opposite sides of a longitudinal plane which will be vertical during take-off and landing, each nozzle being adjustable to turn an efflux therethrough between rearward and downward directions with rotation of the equivalent thrust vector of the efflux about a rotation axis, means connecting the nozzles on one side of the plane of symmetry to receive respectively air from the compressor section of one of the engines and exhaust gas from the turbine section of the other of the engines, and means connecting the nozzles on the other side of the plane of symmetry to receive respectively exhaust gas from the said one of the engines and air from the other of the engines.

An arrangement of this kind makes it possible, irrespective of whether one or both engines are operating, for the resultant of the thrusts from the nozzles to lie always in, or at least near to the plane of symmetry of the housing and to turn approximately about the same point in the plane of symmetry when the nozzles are rotated.

Preferably the engines are abreast of one another, that is to say neither is in advance of the other, but alternatively one may be in advance of the other by a distance which is a fraction of the total length of each engine.

The invention is of particular interest for the case of a twin-engined winged aircraft in which part of the fuselage main body constitutes the housing surrounding the engines, since the introduction of large turning moments on the aircraft when an engine is shut down or loses power is directly avoided by the arrangement of the jet propulsion nozzles.

The invention is however also of interest in connection with winged aircraft comprising two or more pairs of engines housed in pods mounted upon and spaced laterally along a wing, each pod constituting the housing of one of the power plants, and being penetrated by the nozzles. In this case the resultant thrust from each pod always acts on the aircraft with substantially the same lever arm, which simplifies the provision of means for automatically compensating for reduction or loss of thrust from one engine.

It will be appreciated that during vertical take-off and landing, and transition to or from horizontal flight, sudden unintentional reduction or loss of thrust from one engine requires immediate compensation to avoid catastrophic loss of control of the aircraft. This can be accomplished automatically if the engines have sufficient short-period overload capacity, the system including for example a thrust measuring device for each engine of a pair, associated with thrust control means for each engine for maintaining the total thrust in accordance with the setting of a thrust selector controlled by the pilot. Such an arrangement, used in an aircraft having either a twin engine power plant or twin pods each with paired engines according to the present invention, would provide useful additional safety during take-off, transition and landing. In the case of a twin pod aircraft for short take-off and landing, or in which the full safety feature is not demanded during vertical take-off and landing, the compensating system can however operate at least partially by reducing the thrust of one pod to offset a turning moment caused by unintentional loss of thrust from the other pod, thus reducing the overload which one engine is required to carry.

Furthermore, even in cases in which danger due to failure of an engine during vertical take-off and transition to wingborne flight is not wholly eliminated, the invention enables a twin or multi-engined aircraft to be cruised at a reduced speed by shutting down one or more engines, without thereby introducing serious out of balance thrust forces, and also enables such an aircraft to be flown back to its base after failure of one engine during normal wingborne flight.

The invention is illustrated by the accompanying drawings, in which:

FIGURES 1 and 2 show schematically in sectional elevation and plan respectively an aircraft having a side-by-side arrangement of the propulsion engines;

FIGURE 1A reproduces part of FIGURE 1 to show one of the nozzles in position for upthrust instead of for forward thrust;

FIGURE 3 is a front view of the aircraft;

FIGURES 4 and 5 are transverse sections corresponding to the lines 4—4 and 5—5 respectively in FIGURES 1 and 2;

FIGURE 6 shows a modified engine arrangement in plan;

FIGURE 7 is a section on the line 7—7 in FIGURE 6;

Figure 10:
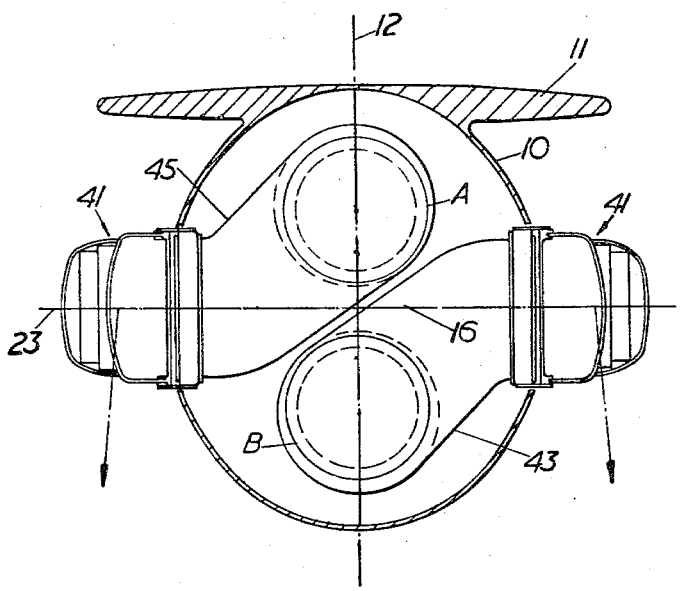
Figure 11:
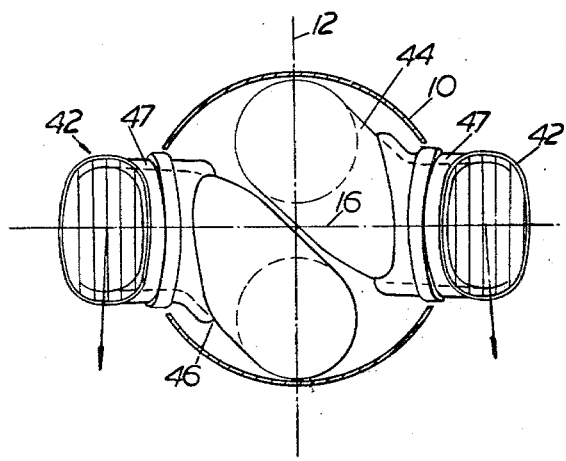

FIGURES 8 and 9 show in elevation and plan respectively a vertically superimposed arrangement of two engines; and FIGURES 10 and 11 are transverse sections corresponding to FIGURES 8 and 9.

The power plant of the aircraft shown in FIGURES 1 to 5 comprises two turbojet engines A and B arranged side-by-side in a surrounding housing 10 which is part of the fuselage main body of a twin-engined aircraft having a delta wing 11, and which has an outer surface which is symmetrical about a longitudinal plane of symmetry 12 which will be vertical during take-off and landing.

Each engine includes a compressor section 13 and a turbine section 14 coaxially arranged, the engines being disposed close together, abreast of one another, and with their axes 15 substantially parallel and inclined slightly downwards to the rear relatively to a datum line 16 which is horizontal in normal wingborne flight. Each engine has an air intake duct 17 extending forwards to a forward-facing intake opening 18 a little below the datum line 16. During horizontal flight the outer surface of the body part constituting the engine housing will be swept by relative airflow in a fore-aft direction substantially parallel to the datum line 16.

The power plant also includes front and rear pairs of jet propulsion nozzles 19 and 20 penetrating the housing outer surface symmetrically on opposite sides of the plane of symmetry 12. The forward nozzles penetrate an underneath surface of the housing and the rear nozzles penetrate side surfaces of the housing. Each front nozzle 19 comprises a part 19a which is journalled for rotation on a stub duct 21. This stub duct extends downwards from a compressed air plenum chamber 22 forming part of the compressor section 13 of the engine. The axis of the stub duct as seen in side elevation is at an angle of 45° to the engine axis 15. The part 19a turns the efflux through an angle of 22½° and has journalled for rotation upon its downstream end a part 19b which turns the efflux through a further 22½°. With the parts 19a and 19b in the positions shown in FIGURE 1, the efflux is deflected through 45° so that it issues rearwards parallel to the engine axis 15 in elevation, as indicated by the arrow 23, and thus has a small lift component. In plan view the arrow 23 may diverge rearwardly from the plane of symmetry 12 to a small extent to take the efflux clear of the rear part of the body 10.

If the nozzle parts 19a and 19b are now turned through 90° in opposite directions their deflection effects will cancel one another so that the efflux discharges substantially in the direction of the axis of the stub duct 21. A still further rotation of each of the parts 19a and 19b in opposite directions will bring the configuration to that shown in FIGURE 1A, in which the efflux is discharged downwards at right angles to the engine axis 15, as indicated by the arrow 24, and thus has a small braking component. The discharge of each efflux is accompanied by the exertion of a corresponding propulsive force on the aircraft. This can be represented by an equivalent thrust vector, which is opposite in direction to the arrows 23 and 24 as the case may be, and which in effect turns about a transverse rotation axis 25 while remaining approximately in the same plane. Vertical lift is obtained at an intermediate setting indicated by the arrow 26.

The rear nozzles 20 are of the pipe-bend type having a cascade of deflector vanes 27 at their outlets which deflect the efflux through nearly 90°. The nozzles are mounted for rotation about transverse axes 28 lying in a plane through the engine axes 15, the axes 28 diverging rearwardly at an angle 29 which is nearly 180°. When the nozzles 20 are in the positions shown in FIGURES 1 and 2, the efflux is discharged rearwards in the direction of the arrows 30, that is to say, substantially parallel to the direction of efflux discharge from the corresponding front nozzles 19, as represented by the arrows 23. By turning the nozzles 20 to discharge downwards, the equivalent thrust vectors (opposite in direction to the arrows 30) are turned about the rotation axes 28, moving in a nearly flat conical surface. In this way upthrust with or without a braking component can be produced, corresponding to the arrows 31 and 32 respectively. It will be seen that the rear nozzles are further from the longitudinal plane of symmetry than the forward nozzles.

The rear nozzles 20 are connected by cross-over ducts 33 each of the turbine section 14 of the engine on the opposite side of the power plant. Each engine thus supplies working fluid to a nozzle on each side of the plane of symmetry 12. The spacing of the rear nozzles from the plane of symmetry is substantially fixed by the shape and size of the body 10, but the spacing of the front nozzles, and the directions of discharge of the nozzles, can be varied, in designing the aircraft, within fairly wide limits and are preferably chosen so that, when the nozzles are adjusted for upthrust, the moment of the thrust of each front nozzle about the centre of gravity G of the aircraft, which lies in the plane of symmetry, is equal and opposite to the moment of the thrust of the rear nozzle on the opposite side of the plane of symmetry, i.e. of the rear nozzle supplied by the same engine. With this arrangement, variations in the power output of one engine relatively to the other have little or no rolling effect on the aircraft.

Equalization of the moments about the centre of gravity when the nozzles are positioned for normal forward flight is naturally also desirable, but of less importance since trimming moments can readily be provided during forward flight by adjustment of the aerodynamic control surface of the aircraft. The air entering the opening 18 of the ram air intake system exerts an inlet drag on the aircraft. It is desirable that this, in conjunction with the equivalent thrust vectors, should not exert a substantial nose-up or nose-down moment on the aircraft. The intake drag passes through the centre of area of the front opening or openings, and each equivalent thrust vector passes through the centre of area of its respective nozzle. The layout of the aircraft makes it convenient for the centres of area of the forward nozzles to be appreciably below the level of the centres of area of the rear nozzles. To ensure that the moment on the aircraft is small, the centre of area of the front opening is placed in a horizontal plane which passes between the centres of area of the front and rear pairs of nozzles. The thrust vectors of neither the front nozzles nor the rear nozzles on the same side of the plane of symmetry move in true planes parallel to one another, but the effects so introduced can be arranged to cancel out for all practical purposes.

FIGURES 6 and 7 illustrates a modification of the engine arrangement already described in which the double-rotation front nozzles 19 are replaced by single-rotation nozzles 34 arranged with their rotation axes 35 in the plane containing the engine axes 15 and substantially parallel to the rotation axes 28 of the rear nozzles on the same side of the plane of symmetry 12. The nozzles 34 connected to the compressor sections of the engines may each be provided with a visor 36 capable of restricting the outlet area of the nozzle when directed rearwards. When the nozzles are turned downwards the restriction is removed and fuel is burnt in the air supplied to the nozzles to provide an increase of thrust for vertical take-off.

It will be apparent from the symmetry of the nozzles that when both engines are producing equal thrusts, the resultant of the thrusts from all the nozzles will lie in the plane of symmetry 12, and that if the nozzles are rotated in unison at equal rates, the resultant will turn about a point in the plane of the engine axes 15 which is distant from the air and gas nozzles in inverse proportion to their thrusts. With reduction or loss of thrust from one engine, the resultant thrust will still lie near to the plane of symmetry 12 owing to the nozzles supplied with efflux from the same engine being on opposite sides of it, and the point about which the resultant turns will be similarly placed.

In some cases the thrust of the front nozzles 34 will be somewhat in excess of that of the rear nozzles 20 even when the air supplied to the nozzles 34 is not being additionally heated, and when the air is being so heated during vertical take-off the disparity will be increased. Furthermore, owing to the front nozzles being, in this arrangement, unavoidably more distant from the plane of symmetry 12 owing to the shape of the housing, the rolling moment which would become effective on the aircraft in the event of a change in the relative power outputs of the two engines is still further increased. To overcome this defect, a further central downwardly directed nozzle 37 is provided which is connected by passages 38A and 38B to the plenum chambers 22 of the engines A and B respectively. A flap valve 39, spring loaded to its neutral position, is arranged to be moved automatically by pressure difference on its two sides in the event of one of the engines being shut down, to isolate the plenum chamber of that engine from the nozzle. During normal two-engine operation the nozzle 37 is closed by a shut-off 40, the interconnection of the plenum chambers reducing the development of rolling moments on the aircraft due to small relative changes in power output of the engines. In the event of one engine having to be shut down, or its power output significantly reduced, the valve 40 is opened to discharge sufficient air from the plenum chamber of the fully operative engine to reduce the rolling moment of its front nozzle 34 to the necessary extent. Since the bottom nozzle 37 is situated in substantially the same transverse plane as the side nozzles 34 this diversion of the efflux does not produce a significant pitching moment on the aircraft.

In the arrangement shown in FIGURES 8 to 11 the two engines A and B are superimposed one above the other. Single-rotation front and rear nozzles 41 and 42 are again used, and are arranged with their rotation axes in a plane 16 which is horizontal during normal wingborne flight, and preferably passes through the centre of gravity of the aircraft. The nozzles 41 and 42 on the starboard side of the plane of symmetry 21 are connected by slanting ducts 43 and 44 to receive respectively air from the compressor section 13 of the lower engine B and exhaust gas from the turbine section 14 of the upper engine A. Correspondingly, the nozzles 41 and 42 on the port side are connected by slanting ducts 45 and 46 to receive respectively air from the compressor section of the upper engine A and exhaust gas from the turbine section of the lower engine B.

To enable the rolling moments of the front and rear nozzles of each engine to be equalised, the rear nozzles are preferably each constructed with an outer flow passage 47 to which air or the products of combustion of additional fuel are supplied through a duct 48 from the plenum chamber 22 of that engine from which it receives exhaust gas. Flow control valves 49 may be provided in the ducts 48 and may be used in place of visors 36 to reduce the total throat area of the nozzles connected to the plenum chambers when additional fuel is not being burnt in these chambers. During vertical take-off and transition to horizontal flight, using both engines, these valves can also be used to control the attitude of the aircraft, differential operation producing a rolling moment and combined operation a pitching moment.

We claim:

1. An aircraft power plant comprising two turbojet engines, each including a compressor section and a turbine section coaxially arranged, the engine being disposed close together, with their axes etxending substantially fore and aft, and with their lengths at least partly overlaping, a common housing closely surrounding the engines and having an outer surface which, during forward flight, will be swept by relative airflow substantially in the fore and aft direction, a front and a rear pair of jet propulsion nozzles, each pair penetrating the housing outer surface with the propulsion nozzles of each pair having each a respective discharge outlet adjacent to the housing outer surface on opposite sides of a plane through the housing which will be vertical and fore and aft during forward flight, first means connecting the nozzles on one side of the said plane to receive respectively motive fluid from the compressor section of one of the engines and exhaust gas from the turbine section of the other of the engines, and second means, adapted to be operative simultaneously with the first means connecting the nozzles on the other side of the said plane to receive respectively exhaust gas from the turbine section of the said one of the engines and motive fluid from the compressor section of the other of the engines.

2. A power plane according to claim 1, wherein the engines wholly overlap one another.

3. A power plant according to claim 1, wherein the two engines are side-by-side.

4. A power plant according to claim 3, wherein the means connecting the nozzles to the engines comprise a stub duct between each compressor section and the front nozzle on the same side of the power plant, and a crossover duct between each turbine section and the rear nozzle on the opposite side of the power plant.

5. A power plant according to claim 4, wherein the front nozzles penetrate an underneath surface portion of the housing and the rear nozzles penetrate side surface portion of the housing.

6. A power plant according to claim 5, wherein the rear nozzles are further from the said vertical fore and aft plane than the front nozzles.

7. A power plant according to claim 4, wherein there is a ram air intake system, the centre of area of the front opening of which lies in a horizontal plane which passes between the centres of area of the front and rear pairs of nozzles.

8. A power plant according to claim 4, wherein the front nozzles penetrate side surfaces portions of the housing, and including a further downwardly directed nozzle, ducting between the further nozzle and each compressor section, and valve means permitting optional discharge of air from either compressor section to the further nozzle.

9. A power plant according to claim 1 wherein the two engines are one above the other.

10. A power plant according to claim 1 wherein the connecting means associated with each of the nozzles of at least one pair each include two separate flow passages, one connected to a compressor section and the other to a turbine section.

11. A power plant according to claim 1, wherein both pairs of nozzles penetrate side surfaces portions of the housing, and including ducting connecting each rear nozzle to receive motive fluid from the compressor section of that engine from which it receives exhaust gas.

12. A power plant according to claim 11, including flow control valves in the ducting.

13. An aircraft including a power plant according to claim 1, and a fuselage constituting the housing of the power plant.

14. A power plant according to claim 1, wherein the nozzles of each pair are symmetrically disposed in relation to the said vertical fore-and-aft plane.

15. A power plant according to claim 1, including means enabling adjustment of each nozzle to turn an efflux therethrough between rearward and downward directions with rotation of the equivalent thrust vector of the efflux about a rotation axis.

References Cited by the Examiner
UNITED STATES PATENTS

| | | | |
|---|---|---|---|
| 2,840,325 | 6/58 | Griffith | 244—74 |
| 2,912,189 | 11/59 | Pouit | 244—52 X |
| 3,018,987 | 1/62 | Multhopp | 244—75 |
| 3,075,725 | 1/63 | Dornier | 244—52 X |
| 3,096,954 | 7/63 | Bauger et al. | 244—23 |

FERGUS S. MIDDLETON, *Primary Examiner.*

ANDREW H. FARRELL, MILTON BUCHLER,
*Examiners.*